United States Patent [19]

Hughes

[11] 3,744,808
[45] July 10, 1973

[54] DRAW CHUCK WITH INDIVIDUALLY ADJUSTABLE CLAMPING JAWS

[76] Inventor: Charles R. Hughes, 308 Vista Baya, Costa Mesa, Calif.

[22] Filed: Feb. 14, 1972

[21] Appl. No.: 225,958

Related U.S. Application Data

[63] Continuation-in-part of Ser. No. 852,651, Aug. 25, 1969, abandoned.

[52] U.S. Cl.................. 279/1 SJ, 279/119, 279/123
[51] Int. Cl............................................. B23b 31/16
[58] Field of Search..................... 279/1 SJ, 66, 110, 279/119, 123, 1 R

[56] References Cited
UNITED STATES PATENTS

| | | | |
|---|---|---|---|
| 94,376 | 8/1869 | Bacon................... | 279/123 |
| 3,166,336 | 1/1965 | Goodrum................ | 279/123 |
| 2,667,358 | 1/1954 | Highberg............... | 279/123 |
| 3,219,356 | 11/1965 | Wilterdink et al...... | 279/123 |
| 2,757,010 | 7/1956 | Sloan et al........... | 279/123 X |

Primary Examiner—Andrew R. Juhasz
Assistant Examiner—James F. Coan
Attorney—John R. Shewmaker

[57] ABSTRACT

A chuck having bell crank driven cylindrical master jaws paired with associated workpiece clamping jaws. Each clamping jaw is securely and safely locked to its master jaw and released therefrom by a clamping plate which is disposed in a radial, T-shaped slot in the clamping jaw. The plate has legs extending rearwardly into a radial passage in the master jaw engaging therein a radially disposed camming pin which is actuable to draw the clamping jaw into locked or released position with the master jaw. The clamping jaw, in its released position, is movable radially with respect to the master jaw, for adjustment or removal by sliding movement on the clamping plate. A locking pin is provided to lock each master jaw against radial movement to machine or bore the clamping jaws. A cylindrical sleeve seals the chuck against contaminating particles.

34 Claims, 11 Drawing Figures

PATENTED JUL 10 1973 3,744,808
SHEET 1 OF 2
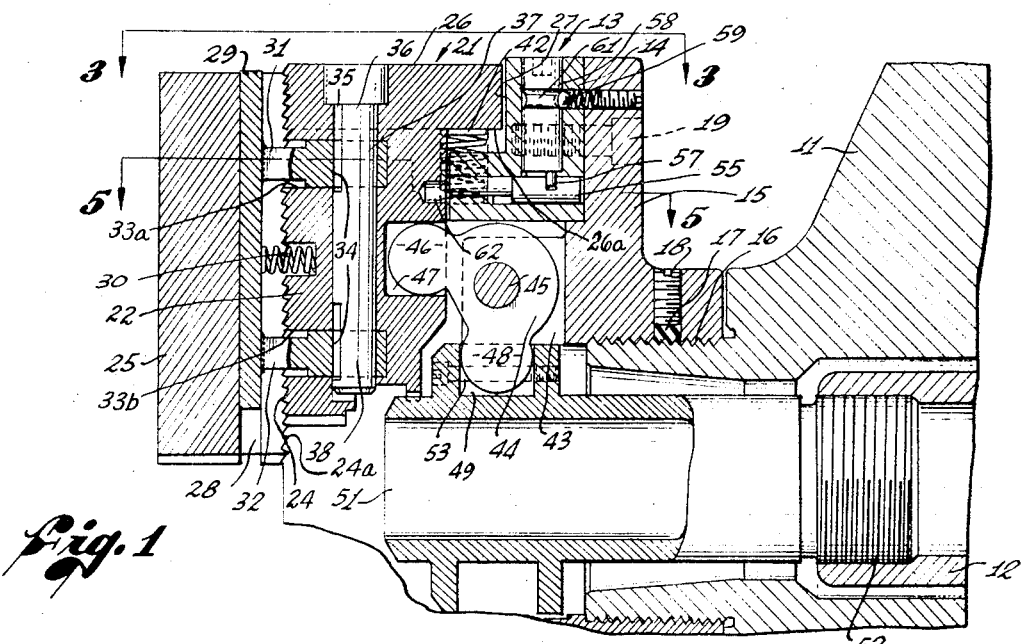
Fig. 1
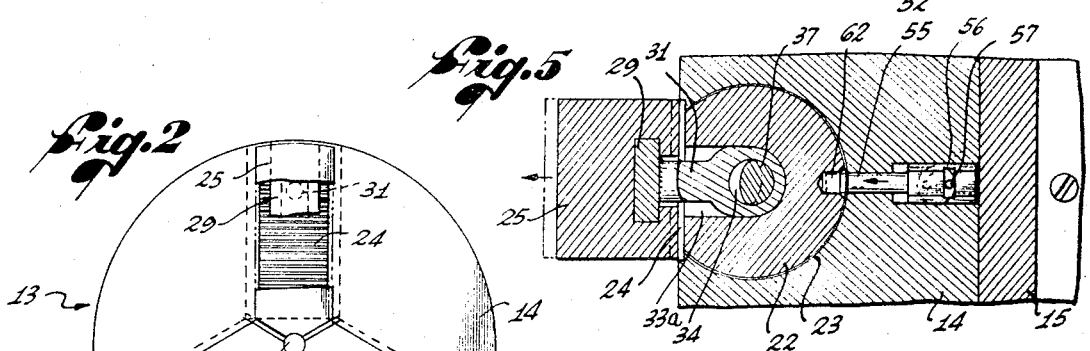
Fig. 2
Fig. 5
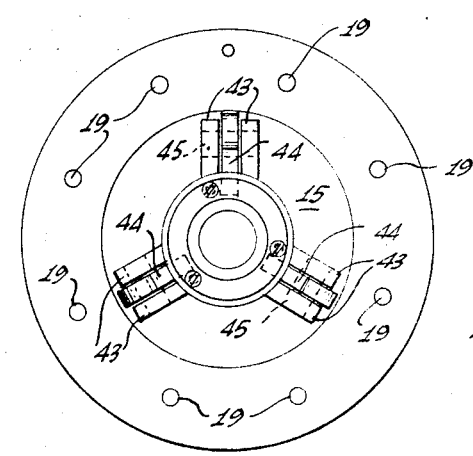
Fig. 4
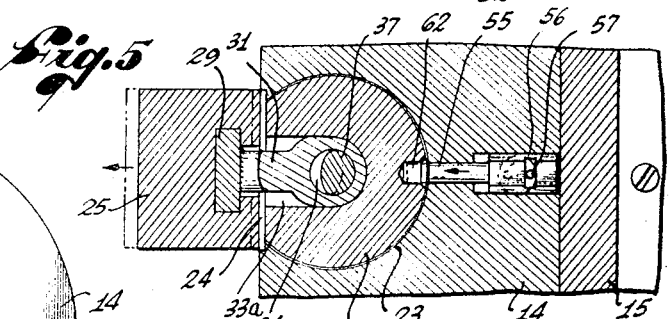
Fig. 3
INVENTOR.
CHARLES R. HUGHES
BY Fulwider, Patton, Rieber
Lee, and Utecht
ATTORNEYS

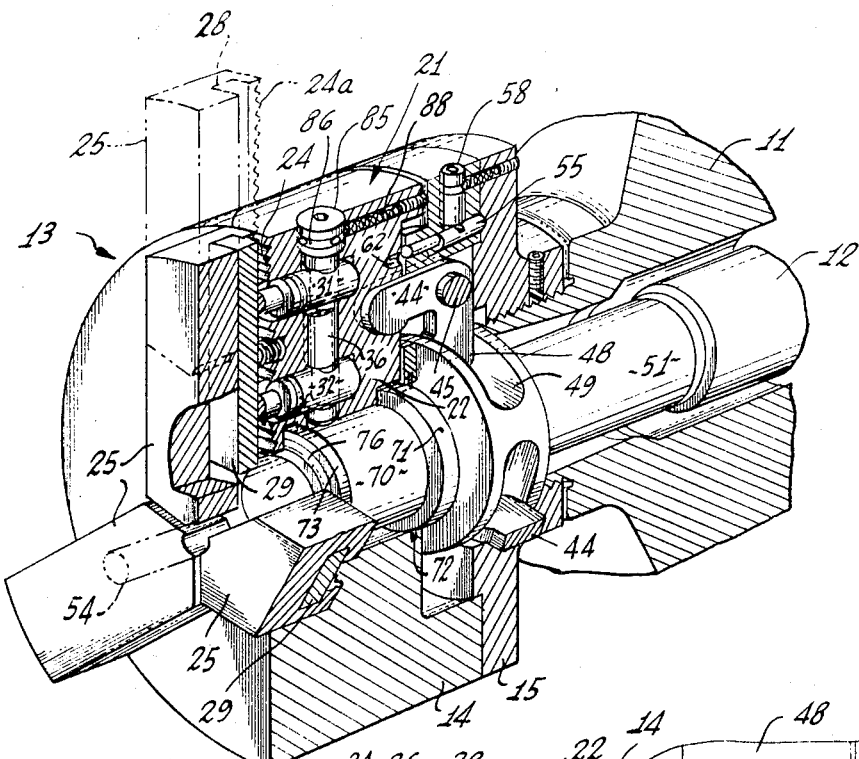
*fig.6*
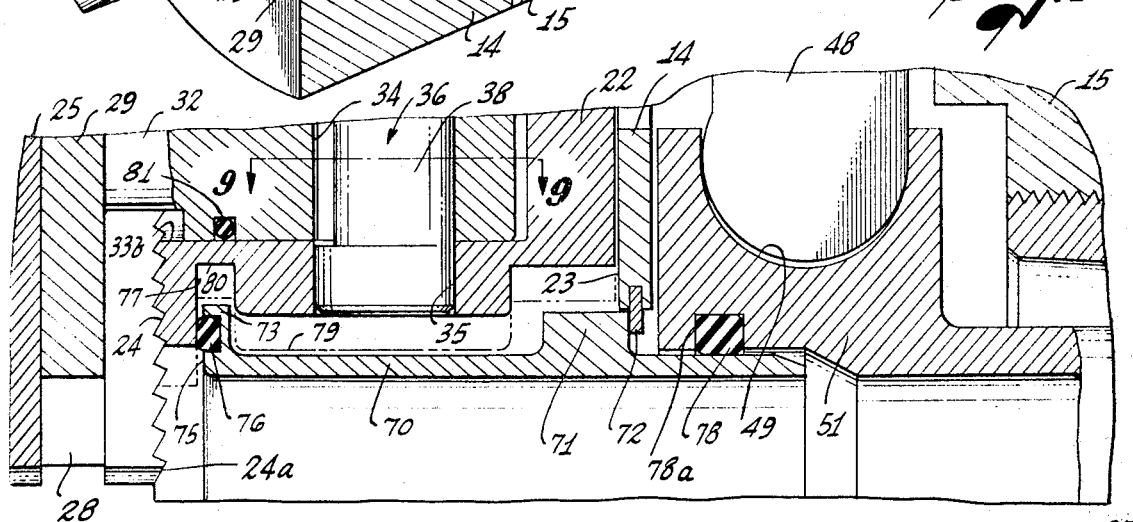
*fig.7*
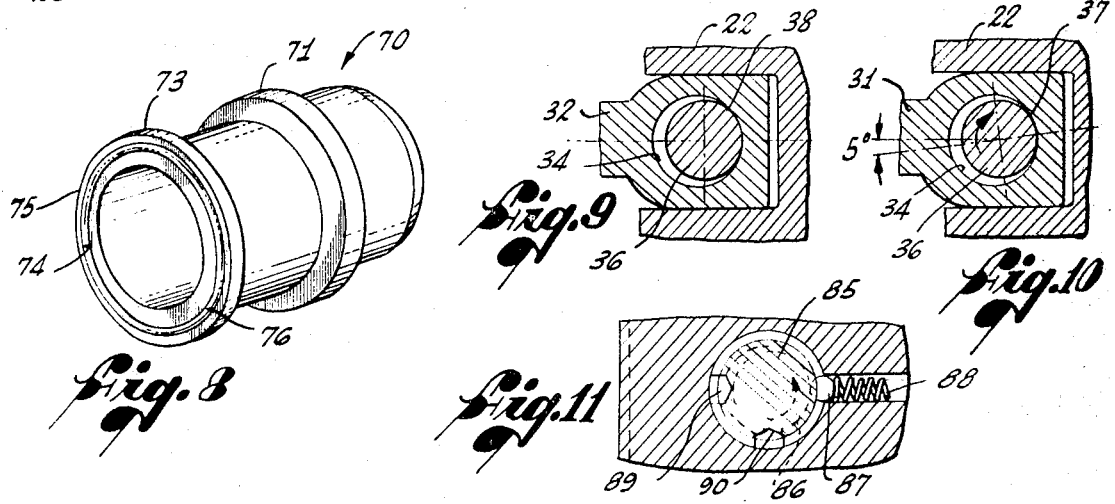
*fig.8*  *fig.9*  *fig.10*  *fig.11*

3,744,808

DRAW CHUCK WITH INDIVIDUALLY ADJUSTABLE CLAMPING JAWS

CROSS-REFERENCE TO RELATED APPLICATION

This is a continuation-in-part of Applicant's co-pending application Ser. No. 852,651, filed Aug. 25, 1969 and now abandoned.

SUMMARY OF THE INVENTION

The chuck according to the present invention has a plurality of paired master and clamping jaws mounted forwardly of the chuck for radial movement relative thereto and spaced angularly thereabout at substantially 120° in the case of three pairs. Each master jaw is substantially cylindrical in form and is received in a complementary radial passage in the chuck, the passage being open toward the front and the master jaw being serrated thereat to present a substantially planar, forward-facing surface. A clamping jaw cooperates with each master jaw and the back surface of the clamping jaw has mating, complementary serrations with interengage with those of the master jaw to firmly hold the jaws together.

The clamping jaws are clamped against the master jaws by radially extending clamping plates and rearwardly extending legs thereon, the plates and legs being disposed in radial T-shaped slots in and preferably extending for the length of the clamping jaws. The plate legs extend axially through openings in each master jaw to a radially disposed passage therein, in which is disposed a camming pin. The camming pin extends through and has camming surfaces engaging openings in both of the plate legs and is rotatable to effect movement of the plate and the clamping jaw thereon toward and away from the master jaw. A compression spring bears against the clamping plate to urge it and the clamping jaw away from the master jaw.

To compensate for the slight twist developed in the camming pin during rotation, and insure that both legs are cammed together, the pin camming surfaces are slightly offset around the pin circumference with respect to one another, so that the clamping plate safely and securely holds the clamping jaw in its locked position on the master jaw. As a further safety feature, a locking detent is provided for the cam pin to prevent its accidental unlocking during operation of the chuck, the detent stopping cam rotation in an intermediate position prior to complete disengagement of the mating jaw serrations.

Each master jaw has an eccentric, generally cylindrical head thereon which is also serrated at its front surface and which prevents rotation of the master jaw within the radial passage. Springs are located in holes in the chuck and bear against the master jaw head to bias the master jaw for radial movement outwardly toward work releasing position.

The chuck also carries axially reciprocable locking pins for locking the master jaws against radial movement. These pins are engaged by crank pins rotatable from the outside of the chuck, whereby the locking pins may be extended into the master jaws.

Bell crank levers are located in the chuck opposite the master jaws and have their opposite legs engaged with the master jaws and with an actuator which is located centrally of the chuck and connected to the drawbar of the machine on whose spindle the chuck is mounted, whereby axial movement of the actuator effects radial movement of the jaws toward and away from a workpiece to be clamped between the clamping jaws. A bolt secured to the actuator is located to interlock with a bell crank lever to prevent involuntary rotation of the actuator relative to the chuck. Locking in clamping position is effected by a cam over lock arrangement on standard drawbar mechanisms.

A cylindrical sealing sleeve is disposed axially within the chuck with opposing ends in sliding, sealed engagement with the actuator and the master jaw, respectively, to seal the internal working parts of the chuck against foreign particles and debris, such as that produced when utilizing the chuck in a grinding operation.

It is therefore an object of this invention to provide an improved draw chuck having paired master and clamping jaws which are provided with clamping plates to clamp the clamping jaws to the master jaws, and having the clamping plate within a radial slot in the clamping jaw so that each clamping jaw in its released position is freely slidable radially with respect to the master jaw for adjustment or replacement of the clamping jaw.

Another object of the invention is an improved chuck in accordance with the preceding object in which each clamping plate has integral legs extending through openings in its master jaw to a radially extending passage therein in which is disposed a camming pin having cam surfaces cooperating with openings through both the legs for moving the plate toward and away from the master jaw.

Another object of the invention is an improved chuck according to the preceding objects and including a manually movable pin for locking the master jaws against movement, at which time the clamping jaws can be bored or otherwise machined in conformance with the shape of the workpiece to be clamped between the clamping jaws.

With the clamping jaws individually adjustable on the master jaws, it is a feature of the invention that the relative locations of the clamping jaws can be changed to accommodate eccentricities in the shape of the workpiece.

Another object of the invention is an improved chuck in which generally cylindrical jaws are received within corresponding cylindrical radial passages in the chuck for radial movement therein without rotation.

Another object of the invention is an improved chuck sealed against contaminants to protect the chuck during grinding operations or the like.

BRIEF DESCRIPTION OF THE DRAWINGS

FIG. 1 is a partial longitudinal sectional view through the chuck of the present invention and showing one of the combined master and clamping jaws thereof;

FIG. 2 is a front elevation view of the chuck with parts of one of the clamping jaws broken away;

FIG. 3 is a partial top plan view from the plane 3—3 of FIG. 1;

FIG. 4 is a front elevational view of the chuck with the jaws removed to show the bell crank arrangement;

FIG. 5 is a partial transverse sectional view on the line 5—5 of FIG. 1;

FIG. 6 is a perspective view, cut away in partial, longitudinal section, of a modified form of chuck having a sealing sleeve, with one clamping jaw shown cut away in part and the same jaw depicted in phantom outline in an adjusted position;

FIG. 7 is an enlarged partial, longitudinal sectional view through the sealing sleeve showing the cooperative relation between the sealing sleeve and both the master jaw and chuck actuator;

FIG. 8 is a perspective view of the sealing sleeve;

FIG. 9 is a partial sectional view, along line 9—9 in FIG. 7, showing one camming portion of the camming pin;

FIG. 10 is a partial section view similar to FIG. 9, but through the second camming portion of the camming pin illustrating the offset relation of the camming portions with respect to one another; and FIG. 11 is a partial, transverse, sectional view, through the camming pin head, showing the locking detent for the pin.

DETAILED DESCRIPTION

The machine head to which the chuck of the invention is mounted is represented in FIG. 1 as having a rotating lathe spindle 11 and a rotating and axially moving drawbar 12. The chuck 13 has an annular body portion 14 and a back cover 15 which is threaded at 16 for mounting on the spindle 11, being held in place by a plug 17 of soft metal, such as brass, and a machine set screw 18. The cover 15 is connected to the body portion 14 by annularly spaced bolts 19.

In the illustrated embodiment the chuck 13 has three pairs of clamping and master jaws angularly spaced at 120°, as shown in FIG. 2. The pairs of jaws are identical and one pair only is shown in FIGS. 1, 3 and 5. The following description of clamping and master jaws is to apply equally to all three pairs.

Each master jaw 21 has a generally cylindrical body portion 22 disposed in a complementary passage 23 in the chuck body portion 14, the passage 23 being open toward the front (the left side of FIG. 1) and the body portion 22 of the master jaw has a serrated front surface 24 providing a substantially planar, forward-facing surface against which the clamping jaw rear surface 24a is itself clamped. The serrated surface 24 is provided with serrations of the order of 0.050 in. apart, and the clamping jaw 25 has complementary serrations on its rear surface 24a which mate and interengage with the serrations on the surface 24 to securely hold the jaws together and to permit their relative radial adjustment (vertically as viewed in FIG. 1) in short increments according to the distance between the serrations.

Each master jaw 21 has a generally cylindrical head 26 thereon which is eccentrically mounted with respect to the body portion 22 and is received within a cylindrical recess 27 within the chuck body 14, the recess forming a radial extension of passage 23, and the head 26 also being segmented at its front to form part of the surface 24 of the master jaw. As indicated in FIG. 3, the body portion 22 of each master jaw has a radius $r$, the head 26 has a radius $R$, and the axes of the body and head are offset by a distance $D$. The master jaw 22 is, by its eccentric head, prevented from rotating in its passage 23 regardless of the presence of a clamping jaw 25.

Each clamping jaw 25 has a T-shaped slot 28 extending longitudinally thereof (vertically in FIG. 1) and in a radial direction with respect to the chuck 13, which slot receives a clamping plate 29 having legs 31 and 32 integral therewith extending into openings 33a and 33b in the master jaw 21. Legs 31 and 32 have openings therethrough at 34 which align with an opening 35 extending radially through the master jaw body portion 22, and a camming pin 36 extends through the opening 35 and has camming portions 37 and 38 thereon cooperating with the openings 34 in the legs 31 and 32, respectively, to draw the legs rearwardly (to the right of FIG. 1) and the plate 29 therewith to force the clamping jaw 25 into clamped supported position on the master jaw 21 with the complementary, mating serrations of the surface 24 and 24a securely interengaged. A compression spring 30 biases the clamping jaw away from the master jaw.

Outside the radius $r$, the chuck body 14 is provided with pairs of radially extending passages 41 in which are disposed springs 42 which bear on the under surfaces 26a of the heads 26 to bias the master jaws radially outwardly into work releasing position.

The back cover 15 is provided with pairs of radially and axially extending lugs 43 in which are pivotally mounted bell crank levers 44, as on pins 45. The bell crank levers 44 have one leg 46 of each disposed in a pocket 47 in the back of a master jaw 21 and their other legs 48 disposed in an annular pocket 49 in an actuator 51 threaded into the drawbar 12 at 52, and after assembly, made non-rotatable with respect to the chuck 13 by a volt 53 extending between the walls forming the annular pocket 49 in a position to interfere with a bell crank lever 44 and thereby prevent involuntary rotation of the actuator relative to the chuck.

As the drawbar 12 and the actuator 51 are moved axially (horizontally as viewed in FIG. 1) of the machine, the bell crank levers 44 will be rotated to effect radially inward and outward (vertical as viewed in FIG. 1) movements of the master jaws 21 and of the clamping jaws 25 thereon into and out of clamping engagement with the workpiece, FIG. 2 showing the clamping jaws moved radially inwardly into clamping engagement with a workpiece 54.

The clamping jaws 25 are preferably of soft steel so as to be easily bored or machined to the dimensions of the workpiece to be clamped therebetween, and for this machining operation, means is provided for locking each master jaw against radial movement. The specific means illustrated is an axially reciprocable locking pin 55 having a transverse slot 56 therein in which engages a crank pin 57 eccentrically mounted on a radially extending pin 58. The pin 58 is held in position by a spring-biased ball 59 pressed in a groove 61 to permit rotation of the pin 58 whereby the crank pin 57 reciprocates the locking pin 55 into and out of a hole 62 in the body portion 22 of the master jaw 21.

The operation of the chuck of this invention will be apparent from the above description. The chuck 13 is threaded onto the machine spindle 11 at 16, while the set screw 18 is loosened and when the parts are tightly mounted, the set screw 18 is tightened. The actuator 51 is threaded into the drawbar 12 by turning the drawbar.

Each pin 36 is individually rotated so that its camming portions 37 and 38 move the legs 31 and 32 and the corresponding clamping plate 29 axially outwardly to release its clamping jaw 25 from the master jaw 21. Each clamping jaw is then moved to and clamped in an adjusted position with respect to its master jaw, and the master jaws are locked in position for a machining operation on the clamping jaws by rotation of the pins 58, whereby the crank pins 57 project the locking pins 55 into the holes 62, thereby locking the master jaws against movement. Thereafter, the ends of the clamping jaws 25 may be bored, or otherwise machined, to conform to the size and shape of the workpiece to be clamped.

The crank pins 58 are then turned to remove the pins 55 from the holes 62 and the master jaws 21, with the clamping jaws 25 thereon, are then free to move radially inwardly and outwardly of the chuck as the actuator 51 is moved axially inwardly and outwardly by the drawbar 12.

Upon completion of the work for a given workpiece, the set-up operation may again be initiated, as first described, with the soft clamping jaws 25 again adjustably clamped to the master jaws by manipulation of the camming pins 36 and then bored or machined to the new workpiece size, after which the jaws are manipulated together, into and out of clamping relation with the workpiece, by axial movement of the drawbar 12 rotating the bell crank levers 44 through the actuator 51.

FIGS. 6–11 depict an alternate form of the chuck 13 having certain modifications to seal the chuck parts from contaminating particles and to securely clamp the master and clamping jaws together with the cam pin 36 held against accidental unlocking. In FIGS. 6–11 the same numerals are used to designate the same elements as those shown and described in connection with FIGS. 1–5.

In certain operations, such as grinding for example, small particles and debris readily collect in the central, axially extending passage of the chuck body 14. When this occurs, the particles are thrown radially outward by centrifugal force into the radially extending, master jaw passages 23, the cam pin openings 35, and the clamping plate leg openings 33a and 33b. As a result, the particles collect in the working parts of the chuck and eventually interfere with or prevent normal operation.

In order to seal these passages and prevent the particles from penetrating into the chuck, a generally cylindrical sealing sleeve 70, illustrated in FIG. 8, is disposed axially within the chuck body 14 in the manner depicted in FIGS. 6 and 7. An outwardly extending, annular shoulder 71 is formed around the sleeve intermediate its front and rear ends, and a spring-steel snap ring 72 anchored in the chuck body bears against the shoulder to hold the sleeve in place restrained against movement.

The front end of the sleeve 70 includes an annular flange 73 with a sealing ring groove 74 formed in its front surface 75 for receiving a conventional O-ring 76. As shown in FIGS. 6 and 7, the front sleeve surface 75 is disposed in working relationship with a rear facing surface 77 of the master jaw body portion 22, and the O-ring 76 provides a sliding seal between the two surfaces. The opposite, rear end of the sealing sleeve is disposed co-axially within the actuator 51, and an O-ring 78 situated within an internal groove 79 in the actuator provides a sliding seal between the actuator and the sleeve.

During normal operation of the chuck 13, axial movement of the actuator 51 results in a corresponding radial displacement of the master jaw 21. In FIG. 7, the parts are shown with the master jaw in a radially outward, workpiece releasing position with the actuator in its extreme leftward position. Axial movement of the drawbar to the right drives the master jaw radially inward, to the point illustrated by the phantom line 79.

The jaw body has a notch 80 therein for receiving the sleeve flange 73, and,significantly,the O-ring 76 seals the jaw rear surface 77 for all positions of the master jaw. Similarly, the rear end of the sleeve extends a sufficient distance into the actuator 51, so that over the range of axial movement of the actuator, the O-ring 78 maintains the desired seal between the parts.

With the sleeve 70 in place, any particles or debris are trapped harmlessly within the sleeve and prevented from entering the jaw passages 23 or cam pin opening 35. If desired, a further O-ring seal 81 may be provided around clamping plate legs 31 and 32 to seal the passages 33a and 33b.

In another modification, the cam pin 36 has its outer and inner camming portions 37 and 38, respectively, slightly offset around the pin circumference to compensate for the slight twist developed during rotation of the pin. Were the camming portions not offset, the pin twist could prevent the inner camming portion from reaching its fully clamped position. FIG. 9 shows the inner camming portion 38 in clockwise rotation just as it begins to tightly cam clamping plate leg 32. FIG. 10 shows the outer camming portion 36 for leg 31 at the same time, with its camming surface offset counterclockwise a few degrees, for example by 5° or so. When the cam pin is tightened, the camming portion 38 engages its leg 32, and as twist develops in the pin, the lagging portion 37 rotates into its cammed position and cams its leg 31. As a result, the two camming portions in their final clamped positions are identically oriented, and both legs are securely held and fully clamped to reduce the possibility of one leg working loose.

To further insure against accidental unlocking of the cam pin 36, a locking detent is provided to stop cam rotation in the unlocking direction at an intermediate point while the serrated jaw surfaces 24 and 24a are still partially locked. The cam pin has a head 85 thereon with an annular groove 86 therearound, as shown in FIG. 6, and a spring-biased ball detent 87, held by spring 88, rides in the groove during cam rotation in the manner depicted in FIG. 11. The cam is illustrated in its fully locked position and is unlocked by counterclockwise rotation in the direction of the arrow.

A first radial pocket 89 is inset into the pin head 86, and when the pin 36 is rotated 180° from the position shown, the detent 87 snaps into this pocket and locks the pin in place. In this position the jaw serrations 24 and 24a are completely disengaged, and the clamping jaws 21 may be adjusted by sliding along the clamping plate 29. A second, intermediate pocket 90 is also provided which engages the detent prior to complete disengagement of the jaw serrations. If during chuck operation, the pin should work loose and begin to unlock, the detent would engage the pocket 90 to lock the pin at that point.

FIG. 6 shows in phantom outline, one of the clamping jaws 25 in a radially adjusted position. Because of the novel construction of the invention, the clamping jaws can be readily moved and clamped in any desired position, even further outward than that illustrated in the figure. Similarly, the full workpiece engaging face of the jaw may be bored or machined away for a major portion of the jaw length, and the jaw can be continuously adjusted radially inward as long as some part of the jaw remains to be held by the clamping plate. In addition, the jaws are readily removed and replaced or, if desired, the same jaw can be turned 180° and reinstalled on the chuck. In this latter fashion, either end of the jaw may be used to clamp a workpiece. Significantly, the jaw with all of its advantages is of simple, one-piece construction, and is therefore straightforward and inexpensive to manufacture.

It will be apparent from the foregoing that while particular forms of the invention have been illustrated and described, various modifications can be made without departing from the spirit and scope of the invention. Accordingly, it is not intended that the invention be limited except as by the appended claims.

I claim:

1. A chuck for clamping a workpiece in a machine comprising:
   an annular body portion;
   a plurality of radially extending passages in said body portion, said passages opening toward the front and being angularly spaced around the body portion;
   a master jaw in each of said passages and presenting a forward-facing surface through the opening;
   a clamping jaw for each master jaw and having a rear surface adapted to be clamped against the forward-facing surface on said master jaw;
   a clamping plate for each clamping jaw, said clamping plates having pairs of legs extending rearwardly therefrom into openings in said master jaws;
   a radially extending passage in each master jaw into which said legs extend, said legs having openings therethrough aligned with said last-mentioned passages; and
   a cam pin extending through each of said last-mentioned passages and through the pair of legs extending thereinto for moving the legs and clamping plates toward and away from the master jaws to clamp and release the clamping jaws on the master jaws.

2. The chuck defined in claim 1 in which:
   said forward-facing and rear surfaces on said master and clamping jaws having complementary serrations thereon spaced a common, substantially small distance apart to interlock the clamping jaw on the master jaw and to provide for adjustment of the clamping jaw relative to the master jaw in increments corresponding to the serration spacing when the clamping plate releases it from clamping engagement.

3. The chuck defined in claim 1 including:
   biasing means between said master jaws and said body portion for biasing the jaws toward workpiece releasing position; and
   actuating means operated by the drawbar of the machine for moving the jaws against the bias into workpiece clamping position.

4. The chuck defined in claim 3 in which:
   said actuating means comprises a member mounted to and movable with the machine drawbar; and
   bell crank levers mounted in the chuck and having their opposite legs engaging respectively said actuating means and a master jaw, whereby axial movement of the drawbar and actuating means effects radial movement of the jaws into and out of workpiece clamping position.

5. The chuck defined in claim 4 in which:
   the chuck and the actuating means are separately threaded on the spindle of the machine and the drawbar thereof; and in which the actuating means and chuck are interlocked to prevent relative movement therebetween.

6. The chuck defined in claim 1 including:
   means for locking the master jaws intermediate their extreme open and closed positions against radial movement to facilitate a machining operation on the clamping jaws.

7. The chuck defined in claim 6 in which said locking means comprises:
   locking pins slidable in the body portion and projectable into and out of openings in the master jaws; and
   a crank pin engaging each locking pin for effective reciprocating movement thereof into and out of locking position.

8. The chuck defined in claim 1 in which:
   said cam pin has cutout portions adjacent said leg openings whereby the remaining portions are eccentrically mounted with respect to the axis of the pin, said eccentric portions on turning of the pin, moving the legs and the clamping plate carried thereby to clamp and release the clamping jaw engagement with the master jaw.

9. The chuck as defined in claim 1 in which:
   each clamping plate and the pair of legs thereon is received in a radially extending T-shaped slot in a clamping jaw so that the clamping jaw is radially slidably movable relative to said clamping plate when released from the master jaw to provide for radial adjustment of the clamping jaw relative to the master jaw when released therefrom by the clamping plate.

10. The chuck defined in claim 1 in which:
    each master jaw having a substantially cylindrical body portion received within a complementary radially extending, cylindrical passage in the chuck body portion and presenting said forward-facing surface through said passage opening.

11. The chuck defined in claim 10 in which:
    said master jaw body portion has a substantially cylindrical head thereon eccentrically mounted with respect to the body portion and received within a recess in the chuck body portion to prevent rotation of the master jaw in its passage.

12. The chuck defined in claim 11 including:
    spring means in said chuck body portion bearing against the under surface of said master jaw head to bias the master jaw toward workpiece releasing position.

13. The chuck defined in claim 1 in which:
    each clamping plate and the legs thereon are received in a radially extending slot in a clamping jaw, the clamping jaw in its released position being radially movable relative to the clamping plate along said slot to provide for radial adjustment of the clamping jaw relative to the master jaw.

14. The chuck defined in claim 13 in which:
    said radially extending slot extends for the length of said clamping jaw so that said clamping jaw may be adjusted radially inwardly or outwardly through the point at which the clamping jaw is removed from the clamping plate.

15. The chuck defined in claim 14 in which:
    said radially extending slot is T-shaped.

16. The chuck defined in claim 2 including:

biasing means for urging the clamping jaw away from the master jaw into its released position, the clamping jaw being moved against the urging of said biasing means into its clamped position on the master jaw.

17. The chuck defined in claim 1 in which:

said annular body portion has an axially extending area and the radially extending passages in the body portion have openings communicating with said area; and in which the chuck further includes means for sealing the last-mentioned openings to prevent entry of contaminants therethrough into the passages.

18. The chuck defined in claim 17 in which:

the sealing means includes a generally cylindrical sealing sleeve disposed axially within said body portion, whereby contaminants trapped therein are prevented by the sleeve walls from radial movement into the body passages.

19. The chuck defined in claim 18 in which:

the chuck further includes an actuator for moving the jaws radially into workpiece clamping position; and the sealing sleeve having one axial portion telescoped with and in sliding, sealed engagement with the axially movable actuator, the sleeve having a further radially extending portion in sliding, sealed engagement with the radially movable master jaws, whereby the actuator and master jaws are sealed to the sleeve over their range of operative positions.

20. The chuck defined in claim 1 and including:

means for rotatably locking the cam pin to prevent accidental unlocking and release of the clamping jaws.

21. The chuck defined in claim 20 in which:

the locking means includes a spring-biased detent adapted to engage and lock the pin at an intermediate point prior to complete release of the clamping jaws.

22. The chuck defined in claim 8 wherein:

the eccentric camming portions of the cam pin are offset around the pin circumference with respect to one another to compensate for twist of the pin when turned, whereby the camming portions upon twist of the pin are oriented together to fully cam both legs.

23. A chuck for clamping a workpiece in a machine comprising:

an annular body portion;

a plurality of radially extending substantially cylindrical passages in said body, said passages opening toward the front of and being angularly spaced around said annular body portion; and a first jaw having a first substantially cylindrical body portion received within a corresponding one of said passages for radial movement within said passage, said jaw having a second body portion eccentrically mounted with respect to the first body portion and received within a corresponding recess in said annular body portion to prevent rotation of said jaw in said passage.

24. The chuck defined in claim 23 in which:

the second body portion and its corresponding recess are substantially cylindrical.

25. The chuck defined in claim 24 in which:

said second body portion has a greater diameter than said first body portion and forms a head thereon.

26. The chuck defined in claim 23 including:

a second jaw connected to said first jaw at the front of said body portion, said second jaw being a clamping jaw for engaging and clamping a workpiece; and means for clamping both jaws into mating contact to interlock said second jaw on said first jaw.

27. The chuck defined in claim 26 wherein:

said clamping means includes a clamping plate carrying the second jaw, the plate being actuable axially between clamped and released positions but restrained against radial movement, whereby the second jaw is radially adjustable along the clamping plate in the released position.

28. A chuck for clamping a workpiece in a machine comprising:

an annular body portion;

a radially extending passage in the body portion and opening along its length toward the front of the body portion;

a master jaw in the passage for radial movement therealong;

a workpiece clamping jaw paired with the master jaw and having a rear surface adapted to be releasably clamped against the forward facing surface of the master jaw for radial movement of the jaw pair into and out of workpiece clamping position;

means for releasably clamping the workpiece clamping jaw to the master jaw including a clamping member having at least one leg extending therefrom into the master jaw; and means within the master jaw for moving the leg and clamping member toward and away from the master jaw to clamp and release the clamping jaw on the master jaw.

29. The chuck defined in claim 28 in which:

the means for moving the leg and clamping includes a radially disposed cam pin within the master jaw having a cam portion for engaging and camming the leg.

30. The chuck defined in claim 28 in which:

each clamping member and the leg thereon are received in a radially extending slot in the clamping jaw, the clamping jaw in its released position being radially movable relative to the clamping plate along said slot to provide for radial adjustment of the clamping jaw relative to the master jaw.

31. The chuck defined in claim 30 in which:

said radially extending slot extends for the length of said clamping jaw so that said clamping jaw may be adjusted radially inwardly or outwardly through the point at which the clamping jaw is removed from the clamping plate.

32. The chuck defined in claim 31 in which:

said radially extending slot is T-shaped.

33. The chuck defined in claim 28 in which:

said forward-facing and rear surfaces on said master and clamping jaws having complementary serrations thereon spaced a common, substantially small distance apart to interlock the clamping jaw on the master jaw and to provide for adjustment of the clamping jaw relative to the master jaw in increments corresponding to the serration spacing when the clamping member releases it from clamping engagement.

34. A workpiece clamping jaw for installation on a chuck, the chuck having a radially disposed master jaw to be paired with the clamping jaw for radially movement together into and out of workpiece clamping positions, the clamping jaw comprising:
a one-piece solid structure having opposing ends;
a rearwardly facing surface between said ends to be paired with a forward facing surface of the master jaw;
a radially extending, T-shaped slot extending through the jaw between its opposing ends and adapted to receive a clamping plate, the plate being actuable to draw the said forward and rear faces into clamped or released engagement, and released clamping jaw being adjustable radially along the plate.

* * * * *